United States Patent [19]
Schmidt

[11] Patent Number: 5,852,933
[45] Date of Patent: Dec. 29, 1998

[54] HYDRAULIC DRIVES SYSTEM FOR A PRESS

[75] Inventor: Stefan Schmidt, Lohr am Main, Germany

[73] Assignee: Mannesmann Rexroth GmbH, Lohr, Germany

[21] Appl. No.: 809,915

[22] PCT Filed: Sep. 12, 1995

[86] PCT No.: PCT/EP95/03604

§ 371 Date: Jul. 7, 1997

§ 102(e) Date: Jul. 7, 1997

[87] PCT Pub. No.: WO96/11796

PCT Pub. Date: Apr. 25, 1996

[30] Foreign Application Priority Data

Oct. 13, 1994 [DE] Germany ............ 44 36 666.3

[51] Int. Cl.[6] .................. B30B 15/16; F15B 1/00; F15B 11/00

[52] U.S. Cl. .................. 60/413; 60/421; 60/484; 100/269.4

[58] Field of Search ............... 60/421, 428, 413, 60/484; 100/48, 269.14; B30B 15/16

[56] References Cited

U.S. PATENT DOCUMENTS

| | | | |
|---|---|---|---|
| 4,235,088 | 11/1980 | Kreiskorte | 72/453.18 |
| 4,707,988 | 11/1987 | Palmers | 60/413 |
| 4,819,429 | 4/1989 | Kordak | 60/448 |
| 5,460,084 | 10/1995 | Ortremba et al. | 100/269.14 |
| 5,499,525 | 3/1996 | Kordak et al. | 72/453.03 |
| 5,568,766 | 10/1996 | Otremba et al. | 60/413 |

FOREIGN PATENT DOCUMENTS

| | | |
|---|---|---|
| 116024 | 8/1984 | European Pat. Off. . |
| 311779 | 4/1989 | European Pat. Off. . |
| 615837 | 9/1994 | European Pat. Off. . |
| 641644 | 3/1995 | European Pat. Off. . |
| 2006654 | 5/1979 | United Kingdom . |

*Primary Examiner*—Sheldon J. Richter
*Attorney, Agent, or Firm*—Emrich & Dithmar

[57] ABSTRACT

The invention relates to a drive system for a hydraulic press. The drive system is of the type of secondary controlled system maintaining an impressed pressure of substantially constant magnitude in a pressure system. A hydraulic transformer comprises a pair of mechanically coupled hydrostatic machines each having a variably capacity. The first machine is connected to the pressure system and the second machine to the press cylinder. The invention provides a drive system in which biasing the press cylinder, rapid tranverse and pressing stroke, decompressing the fluid and flushing of hot fluid is accomplished in a closed loop free of throttling losses. The hydraulic transformer further allows to recover energy to the pressure system.

12 Claims, 4 Drawing Sheets

4
HYDRAULIC DRIVES SYSTEM FOR A PRESS

The present invention relates to a hydraulic drive system for a press, comprising a hydrostatic machine operating to maintain a substantially constant pressure in a fluid system and a hydraulic transformer.

BACKGROUND OF THE INVENTION

A system of this type is disclosed in German patent 32 02 015 owned by applicants. The system refers to a so-called secondary controlled drive system comprising a hydraulic transformer which is hydraulically connected to the fluid system in which a substantially constant pressure is being impressed. The transformer is defined by a pair of mechanically coupled hydrostatic machines each having an adjustable flow rate capacity. While the first hydrostatic machine is hydraulically connected to the fluid system, the second hydrostatic machine is hydraulically connected to a working cylinder. Accordingly, a secondary controlled drive system may be utilized for operating a working cylinder, resulting in a substantial saving of energy since the first hydrostatic machine connected to the fluid system of constant pressure only draws the amount of hydraulic energy from the fluid system which is required to satisfy the energy demand of the load, whereas in reverse the hydraulic energy being produced when the first hydraulic machine is operating as a pump, is returned to the fluid system to load an accumulator.

Generally, it is an aim of the present invention to operate a press cylinder of a hydraulic press in using a secondary controlled drive system of the type referred to. Principally it is known to subject both cylinder chambers of a press cylinder to a predetermined biasing pressure which is delivered by a separate biasing pump. For a press cylinder of the synchronizing type, i.e. a piston having equal annular piston area, identical biasing pressures readily result in both cylinder chambers. However, considering a differential cylinder, identical biasing pressures in the piston sided cylinder chamber as well as in the piston-rod-sided cylinder chamber may be produced by additional by providing at least a supplemental cylinder, i.e. the annular piston area of all cylinders should be substantially identical to the piston area of the press cylinder. This principle is known in fluid systems of different types.

SUMMARY AND OBJECT OF THE INVENTION

Accordingly, it is an object of the present invention to provide a drive system of the type referred to such that the biasing pressure may be produced in a simple and effective manner and that the losses in operating a press may be substantially reduced and, furthermore controlling press is simplified.

According to the invention, the press cylinder is hydraulically connected to the fluid system of the primary hydraulic machine, i.e. the fluid system in which an impressed pressure of substantially constant value is maintained, thus delivering the biasing pressure required for the press cylinder. According to the invention, the biasing of the press cylinder thus is provided free of any losses in tapping the constant pressure system which in combination supplies fluid to the first hydraulic machine of the hydraulic transformer. It is thus an advantage of the present invention to eliminate a separate biasing pump. Neither, the biasing pressure is produced by lowering a higher hydraulic pressure, for example by reducing a maximum operating pressure to the biasing pressure, nor by providing a special means as required in prior art systems. Furthermore, the supplemental cylinders required for a pressure balance of the press are also hydraulically connected to the fluid system of substantially constant pressure, i.e. the cylinder chambers of said supplemental cylinders are subjected to the biasing pressure. The supplemental cylinders are provided for acting in parallel to the press cylinder and the total sum of all annular areas of the cylinder pistons is equal or somewhat higher than the piston area in the piston sided chamber of the press cylinder.

The fluid system of substantially constant pressure is connected to the press cylinder through a check valve so that any fluid drained to a reservoir due to a possible leakage in the press and/or in a flushing operation can be replaced anytime. In addition, the fluid line between the fluid system and the press cylinder may comprise a pressure control valve which is used to reduce the impressed pressure in the fluid system to the biasing pressure required in cases only when the biasing pressure shall be smaller than the pressure required for the motor operation of the first hydrostatic machine of the transformer. As a rule, the biasing pressure and thus the operational pressure for the first machine of the transformer is about two third of the maximum press pressure. Thus the second hydrostatic machine of the hydraulic transformer acting as a pump for moving the press piston is designed such that the maximum flow volume is delivered at about two third of the maximum pressure. Accordingly, should the pump reach the maximum pressure when performing the press stroke, the pump must pivot back to two third of the maximum delivery capacity. From this, however, there are no limitations to the pressing cycle.

A particular advantage of the drive system results from the fact that the complete pressing cycle such as advancing in a rapid traverse, pressing, decompressing, returning in rapid traverse and flushing the hot fluid may be controlled by a single hydrostatic machine to be used as the actuating unit. For controlling the fluid flow, less valves are required, particularly using 2/2 directional control valves (two ports/two positions). No proportional valves are required in the system, except the pilot valves of the variable displacement pump. Changing over from rapid traverse to the pressing operation takes place through the check valve function of the 2/2 directional control valves associated to the press cylinder without requiring any active change-over means as this will be explained later.

Furthermore, the press cylinder and the supplemental cylinders are designed with respect to volume such that the complete pressing cycle may be performed in a closed circuit, i.e. there is no need to exterminate any energy inherent to the system. Accordingly (claim 5), the piston areas of the cylinders in relation to the piston area of the press cylinder are designed such that the rapid traverse as well as the pressing stroke are performed in a closed loop of the fluid via the second machine of the hydraulic transformer, not considering volumetric losses of the pumps. These losses are automatically compensated by the valve 23, thus eliminating the need of supplying fluid from the fluid system or returning fluid from the reservoir. According to the invention, the system is designed such that throttling and fluid losses are avoided which are inherent to the prior art. The energy recovered in the decompressing and flushing operation is returned to the fluid system of substantially constant pressure, i.e. a hydraulic accumulator. According to the invention, the press may thus perform a high number of strokes. The volume of fluid needed for rapid traverse and for pressing is small. Still further the losses are small.

Despite the fact that the drive system for the press needs a total of three hydrostatic machines resulting in a worse efficiency because of a multiple energy conversion, it can be shown that the losses are nevertheless substantially reduced up to 65% when compared to conventional drive systems. For the required power merely a medium power rate must be installed. The required power rate may be thus reduced down to 15% of the required power rate of conventional systems. Thus, an optimum efficiency results for the pressing cycle.

The hydraulic drive system according to the invention may be either applied to a differential cylinder or to a synchronizing cylinder. In the latter case, however, a pair of hydraulic transformers must be provided, i.e. a first transformer for performing the rapid traverse of the press cylinder and a second hydraulic transformer for performing the pressing stroke. Otherwise the means for subjecting the press to the biasing pressure and so on are identical to the means utilized for the drive system comprising a differential cylinder.

BRIEF DESCRIPTION OF THE DRAWING

Preferred embodiments of the drive system of the invention are illustrated in the drawings in which.

DESCRIPTION OF PREFERRED EMBODIMENTS

Figure 1:
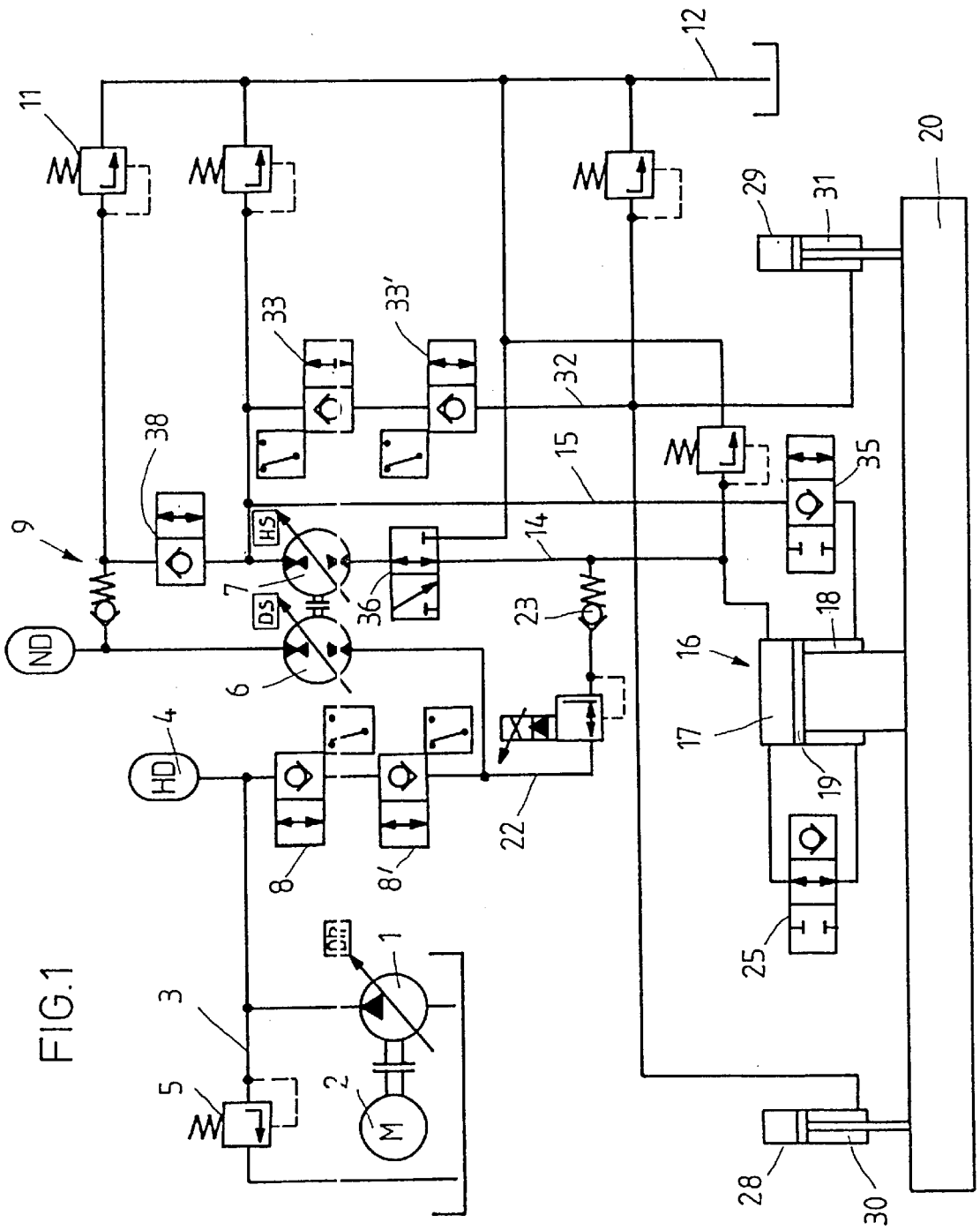
FIG. 1 is a schematic diagram of a hydraulic drive system according to the invention for a press cylinder of the differential type.

According to FIG. 1 a hydrostatic machine 1 of variable capacity which is driven from a motor 2 delivers fluid to a pressure line 3 including a hydraulic accumulator 4. The adjustment of the hydraulic machine 1 is controlled such that an impressed pressure of a substantially constant value is maintained in the pressure line 3. The valve 5 is a safety pressure valve.

A hydraulic transformer comprises a first hydrostatic machine 6 and a second hydrostatic machine 7 mechanically coupled to said first machine. Both machines are variable capacity units with two directions of flow. The designations DS and HS relate to the adjusting system for controlling the flow capacity of each machine. Either machine can operate as a pump or, respectively, as a motor. When the first machine 6 operates as a motor, the safety valves 8 and 8' are operated to be in open position and the machine 6 is driven by the pressure fluid from the fluid system 3 of constant pressure. The fluid leaving the machine 6 flows to a low pressure system 9 which may comprise an accumulator ND. The pressure in the low pressure system is determined by a valve 11 which is adjusted such that a relatively small pressure, but somewhat above the pressure in a reservoir 12 is maintained in the low pressure system. The machine 6 operating as a motor drives the second hydrostatic machine 7 which ports are hydraulically connected through lines 14 and 15 to a press cylinder 16. The line 14 is connected to the piston sided cylinder chamber 17 and the line 15 is connected to the piston rod sided cylinder chamber 18. The piston 19 of the press cylinder 16 thus includes a piston face adjacent the chamber 17 and an annular face adjacent the annular chamber 18. The piston is mechanically connected to a press 20.

The piston 19 of the press cylinder 16 is thus displaced by the fluid delivered by the second machine 7 depending on the sense of rotation. The sense of rotation is controlled by the adjusting system HS of the machine 7 which can be pivoted across zero. The pivot angle determines the flow rate delivered and thus the speed of the piston 19. The operation of the hydraulic transformer 6, 7 for driving a working cylinder is also explained in German 32 02 015 above referred to.

In order to obtain a displacement of the press piston in a closed loop free of losses in performing a rapid traverse and a pressing stroke, a pair of single acting supplemental cylinders 28 and 29 is provided, the pistons thereof also being connected to the press 20. The annular piston areas of the supplemental cylinders 28 and 29 together with the annular piston area of the piston 19 are substantially identical to the piston area of the press cylinder, i.e. the area of the piston 19 adjacent the cylinder chamber 17.

Accordingly, in lowering the press, the fluid displaced from the piston rod sided cylinder chambers of the cylinders 16, 28 and 29 will fill the piston-sided cylinder chamber 17 which increases in volume, i.e. there is no need for additionally supplying any fluid from the system 3. Preferably, the annular piston areas are a bit larger to compensate for any leakage of the driving machine 7, thus avoiding a reduced biasing force while the press operates in a rapid traverse.

The piston-rod-sided cylinder chambers 30, 31 of the supplemental cylinders 28 and 29 are connected to each other through a line 32 which is hydraulically connected through safety valves 33 and 33' required by safety regulations to the low pressure port of the machine 7 including the line 15 which in turn is connected through a valve 35 to the piston rod sided cylinder chamber 18 of the press cylinder 16. The piston sided cylinder chambers of the supplemental cylinders 28 and 29 are connected to the reservoir (not shown).

All the pistons of the cylinders 19, 28 and 29 of the press are biased on either side thereof, i.e. the cylinder chamber 17, 18,30 and 31 each are subjected to a biasing pressure. According to the invention, this is accomplished by a tapping line 22 comprising a check valve 23 opening towards the hydraulic line 14. Both the cylinder chambers 17 and 18 are connected to each other through a valve 25. This valve is also referred to as a short circuit valve 25. In the short circuit position shown in the drawings, the valve 25 connects both cylinder chambers 17 and 18 to each other, i.e. the constant pressure in the pressure line 3 functions to be the biasing pressure for the press cylinder 16 in both cylinder chambers 17 and 18. Furthermore, the cylinder chambers 30 and 31 of the supplemental cylinders 28 and 29 are connected to the cylinder chamber 18 of the press cylinder 16 via the line 32, both the safety valves 33, 33' required by safety regulations, the hydraulic line 15 and the directional control valve 35. The valve 38 located in the low pressure system is in a closed position. According to the invention the biasing pressure is thus made available in a simple way in all cylinder chambers 17, 18, 30 and 31 required for pressure compensation free of losses by tapping the pressure line 3 through the check valve 23.

The operation is as follows: For travelling a rapid traverse in advancing the press 20 the short circuit valve 25 is in the position shown according to which both cylinder chambers 17 and 18 of the press cylinder 16 are connected to each other so that both chambers are subjected to the biasing pressure from the constant pressure line 3. The directional control valve 35 is positioned as shown and the safety valves 33 and 33' are operated to be opened. As soon as the second hydraulic machine 7 being driven by the machine 6 to operate as a pump is adjusted towards a higher flow rate, the pump 7 delivers fluid from the piston rod sided cylinder chambers 30 and 31 through the lines 32 and 14 to the piston sided cylinder chamber 17, i.e. the piston 19 of the press cylinder 16 is rapidly lowered. At the same time, fluid passes through the short circuit valve 25 from the annular chamber 18 of the press cylinder 16 to the piston chamber 17. While the cylinder chambers are subjected to the biasing pressure, the piston 19 is exclusively displaced by the fluid flowing out of the piston-rod-sided cylinder chambers 30 and 31 of the supplemental cylinders 28 and 29. However, the hydraulic machine 7 operating as a motor may drive the hydraulic machine 6 for returning fluid from the low pressure system 9 to the accumulator 4, thus recovering energy, when the weight of the press is heavy enough so that the press does not require any pressurized fluid to perform the rapid traverse, but rather is lowered by the fluid displaced from the cylinder chambers 30 and 31 of the supplemental cylinders 28 and 29.

In performing the pressing stroke the hydraulic machine 7 is pivotally adjusted to change from the flow rate required for the rapid traverse to the pressing speed, i.e. the press slows down. At the time of contacting a work piece (not shown) a counterforce results decreasing the holding pressure in the line 15 or 32, and thus in the cylinder chambers associated therewith. Now, the short circuit valve 25 is in a closed position resulting in a pressure difference prevailing in the cylinder chambers 17 and 18. The short circuit valve 25 may be designed such that it automatically closes when the counterforce occurs. Now the pump 7 is pivoted to a higher flow rate delivering the fluid displaced from all piston-rod-sided cylinder chambers 18, 30 and 31 to the piston-sided-cylinder chamber 17. In this operation, the valve 38 associated to the low pressure system is regularly in a closed position so that the pressure increase required for the pressing stroke is obtained by using the relatively high pressure in the piston-rod-sided cylinder chambers rather than delivering fluid from the low pressure system 9. However, when the high pressure should decrease resulting in the danger that the pump 7 suffers from cavitation, the check valve 38 opens and fluid may be sucked from the low pressure system.

When reaching the maximum pressure, the pump 7 is pivoted to a lower capacity. Accordingly, the drive unit 6 must be not rated accordingly. The available maximum pressure can be thus arbitrarily selected to be higher than the biasing pressure.

Performing the pressing stroke results in a compression of the fluid in the cylinder chamber 17. The hydraulic machine 7 functions to decompress the fluid by being driven from the high-pressure fluid delivered from the cylinder chamber 17, thus driving the hydraulic machine 6 acting as a pump. The energy made available in the decompressing step will be thus recovered and fluid is pumped through the safety valves 8, 8' to the hydraulic accumulator 4 of the high pressure system 3. In performing this step, the valves 33 and 33' are in the position shown, i.e. check valve function and the short circuit valve 25 is in open position.

As the operating cycles above referred to do not regularly need an additional fluid supply from the fluid system 3, the fluid circulating in the drive system while performing the rapid traverse and pressing stroke will be substantially heated. Accordingly, the fluid circulation is provided with a flushing operation.

For flushing during stillstand of the press a directional control valve 36 located in the hydraulic line 14 is opened to connect the outlet port of the pump 7 to the reservoir 12. The fluid volume drained to the reservoir is replaced from the constant pressure system 3 via the check valve 23 opening towards line 14 such that the total volume of heated fluid filling the press cylinder 16, the line 15 and the machine 7 is drained to the reservoir and is replaced by fresh fluid. While performing the flushing step, the hydraulic machine 7 is driven by the fluid displaced from the press cylinder 16 and the remaining system, the fluid being delivered through the line 15 to the machine 7, thus utilizing the pressure difference between the biasing pressure and the reservoir pressure even in flushing to recover energy and to supply fluid through the hydraulic machine 6 acting as a pump to the constant pressure system 3. While flushing, the supplemental cylinders 28 and 29 are blocked by the safety valves 33 and 33', i.e. the press is being maintained in a predetermined position. The operation above referred to relates to flushing the fluid while the press is stopped or in a stillstand position.

However, the flushing step may be also performed while the press is operating. During decompressing the fluid flowing out from the hydraulic machine 7 operating as a motor for driving the hydraulic machine 6 will be not returned to the piston rod sided cylinder chambers 18, 30 and 31, but is rather supplied to the low pressure system 9 through the valve 38. Replacing the fluid again takes place from the constant pressure system 3 through the check valve 23 now opening. The time required for balancing the pressure in the cylinder chambers possibly then requires a longer period of time since the fluid flowing out of the cylinder chamber 17 is not used for increasing the pressure in the chambers 18, 30 and 31. In any case, the press must be not at stillstand when a flushing operation is desired.

Figure 2:
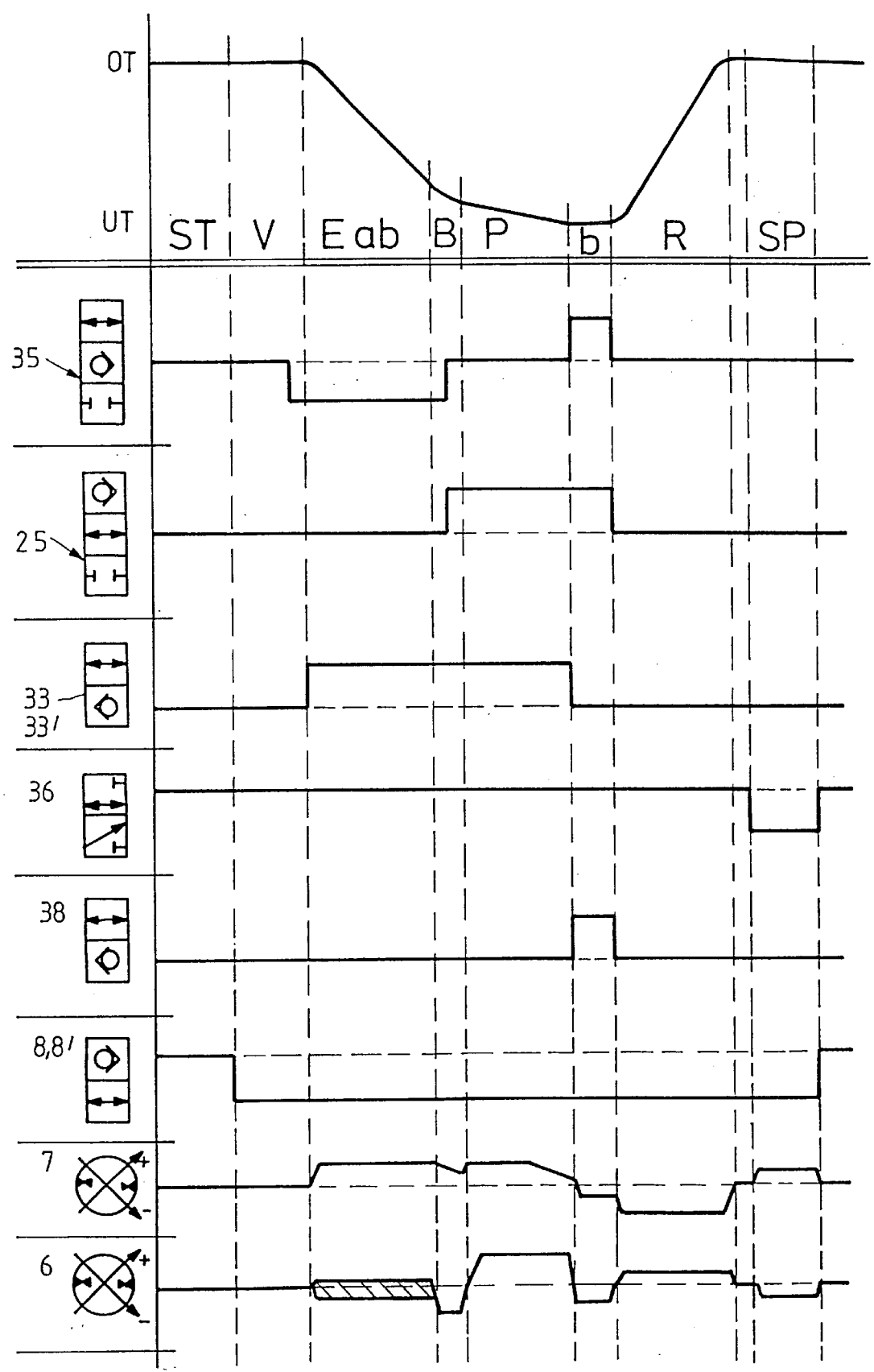
FIG. 2 is a diagram of the valve positions and of the adjustment of the hydraulic transformer for a pressing operation including decompressing of the drive system of FIG. 1.

FIG. 2 shows the valve position as well as the adjustment of the hydraulic machines of the transformer during the stillstand ST of the press, for the biasing operation V, a rapid traverse in lowering Eab, slowing down (braking) B, pressing P, decompressing D, returning R of the press and flushing SP at stillstand. Concerning the hydraulic machines 6 and 7 of the transformer, FIG. 2 indicates their operation as a pump or as a motor, thus consuming energy from the constant pressure system or recovering energy to the constant pressure system.

Figure 3:
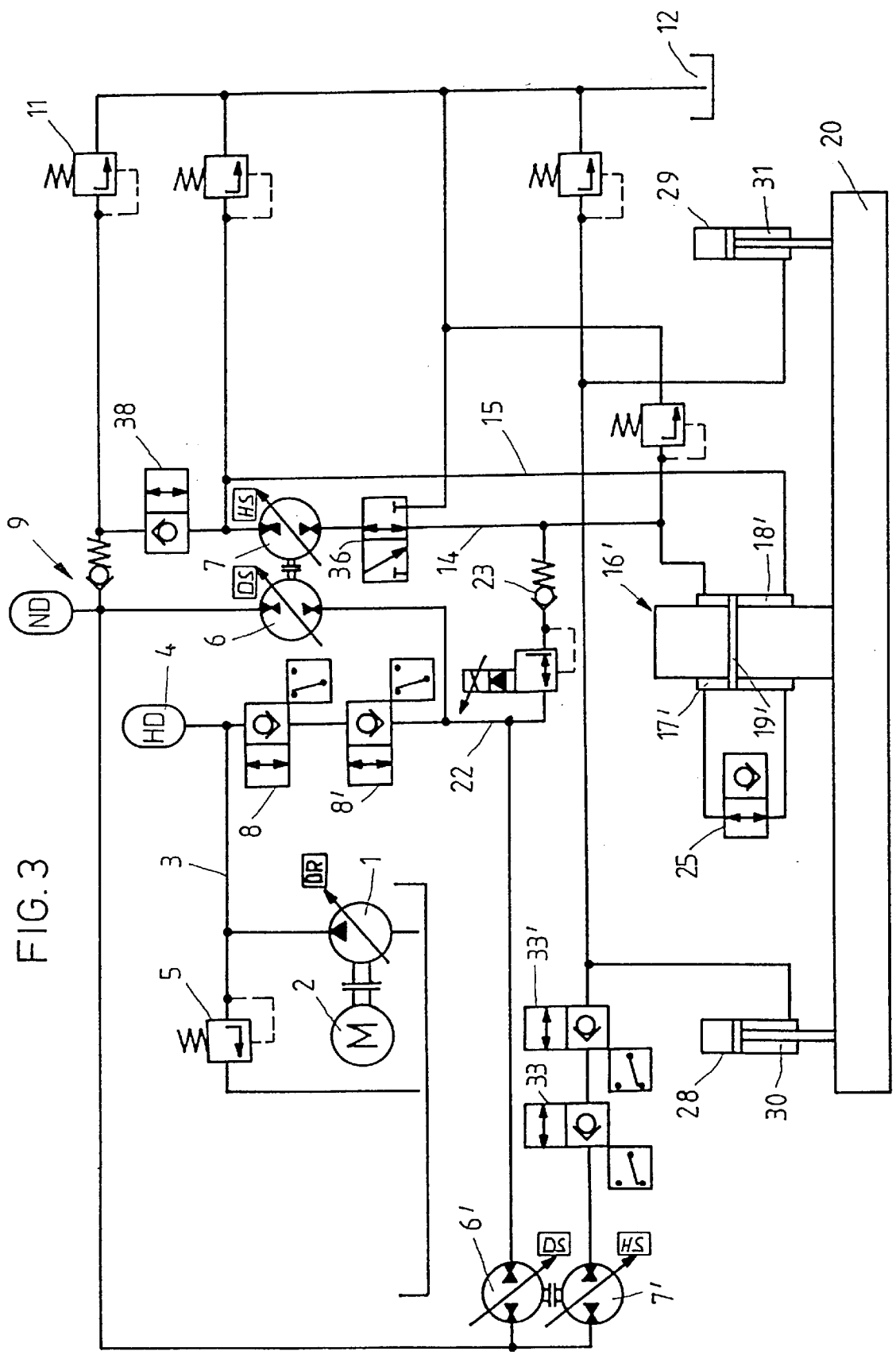
FIG. 3 a schematic diagram of a hydraulic drive system according to the invention for a press cylinder of the synchronizing type.

FIG. 3 shows a drive system for a press cylinder 16' of the synchronizing type including a piston 19' having a piston rod at either side and cylinder chambers 17' and 18'. All the other components corresponding to the drive system of FIG. 1 have the same reference numerals. To accomplish the closed loop operation according to the invention and in performing the pressing operation for the embodiment of FIG. 3 as well, it is required to disconnect the supplemental cylinders 28 and 29 from the press cylinder 16'. For performing a rapid traverse of the press, a second hydraulic transformer is therefore required, again comprising a first hydrostatic machine 6' and a second hydrostatic machine 7' which both are mechanically coupled and each having a variable capacity. Again, the first machine 6' is connected to the hydraulic line 22, i.e. the pressure system of impressed pressure, while the second hydraulic machine 7' is connected to the pistonrod-sided cylinder chambers 30 and 31 of the supplemental cylinders 28 and 29. The remaining ports of both machines 6' and 7' are connected to the reservoir or, respectively, to the low pressure system 9.

It is possible to accomplish a closed loop for the fluid while performing a rapid traverse and the pressing stroke of the press cylinder 16'. The volumes of both cylinder chambers 17' and 18' are identical. Decompressing and flushing the fluid available in the closed loop is performed in the manner already described with respect to FIG. 1. The same applies to supplying the biasing pressure through the hydraulic line 22 including the check valve 23.

A rapid traverse in lowering the press 20 as well as lifting the press is performed by means of the second hydraulic transformer 6' and 7', wherein the cylinder chambers 17' and 18' are merely connected to each other through the short circuit valve 25 while these steps are performed.

Figure 4:
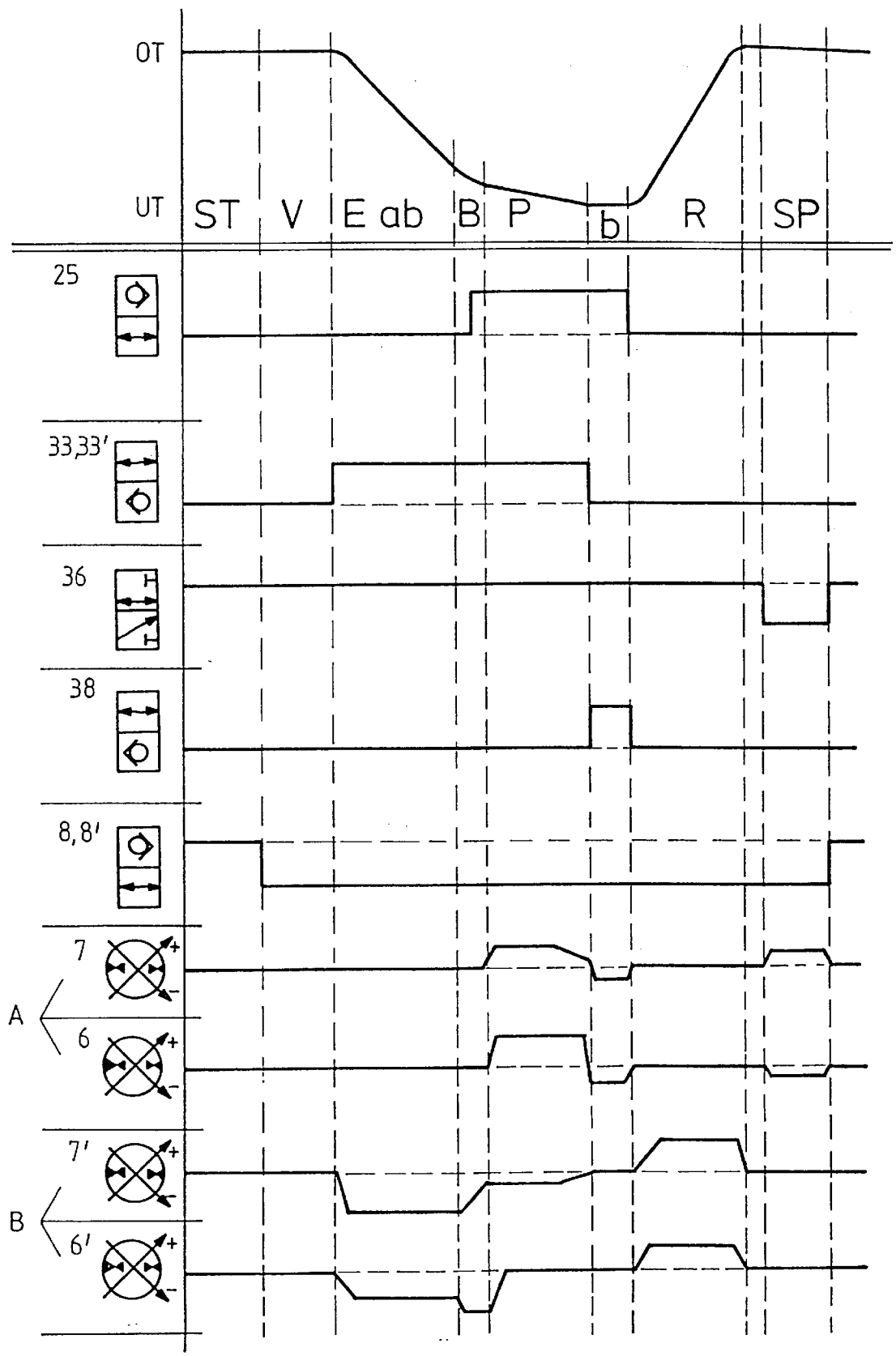
FIG. 4 a diagram of the valve position and of the adjustment of the hydraulic transformer for a pressing operation including decompressing in the drive system of FIG. 3.

The valve positions as well as the adjustment of the hydraulic machines of both hydraulic transformers are indicated in FIG. 4 again. For the operation of the second hydraulic transformer 6', 7' it is assumed that the weight of the press is heavy enough to be lowered after actuating the valves 33 and 33' to an open position, thus the fluid displaced from the cylinder chambers 30 and 31 driving the second hydraulic machine 7' to act as a motor driving the hydraulic machine 6' for returning the energy to the pressure system. Accordingly, for lifting the press merely the hydraulic machine 7' must be driven to operate as a pump for delivering fluid to the cylinder chambers 30 and 31.

I claim:

1. A hydraulic drive system for a press, comprising a hydrostatic machine operating as a pump when being driven to maintain an impressed pressure of substantially constant magnitude in a fluid system including a hydraulic accumulator, further comprising a hydraulic transformer including a first hydrostatic machine of variable capacity and operating either as the motor or as a pump which first hydrostatic machine is connected to the fluid system, and a second hydrostatic machine of variable capacity and operating as a motor or as a pump which second hydrostatic machine is mechanically connected to said first machine, and a press cylinder including a pair of cylinder chambers which are hydraulically connected to both hydraulic ports of said second hydrostatic machine, characterized in that said fluid system (3,4) is hydraulically connected to both cylinder chambers (17,18) of the press cylinder (16) to subject both cylinder chambers to a biasing pressure corresponding to the pressure prevailing in said fluid system of substantially constant pressure.

2. The drive system of claim 1, wherein the connecting line between the fluid system and the press cylinder includes a check valve (23).

3. The drive system of claim 1, wherein both cylinder chambers of the press cylinder are hydraulically connected to each other through a short-circuit valve (25).

4. The drive system of claim 3, wherein the short-circuit valve automatically closes when a pressure difference occurs in the cylinder chambers of said press cylinder.

5. The drive system of claim 1, wherein said press cylinder includes a differential piston, comprising at least a supplemental cylinder (28,29) acting parallel to said press cylinder, wherein the sum of all the annular piston areas of said cylinders (16,28,29) is substantially equal or somewhat higher than the piston area facing the cylinder space (17) of said press cylinder, and wherein the cylinder chambers associated to the piston rods are connected to each other when the press performs a rapid traverse and wherein the cylinder chambers are connected to the low pressure port of said second hydrostatic machine (7) in performing the pressing stroke.

6. The drive system of claim 5, wherein the piston rod sided cylinder chambers (30,31) of said supplemental cylinders are also hydraulically connected to the fluid system to subject the said cylinder chambers to a biasing pressure corresponding to the pressure in the fluid system of substantially constant pressure.

7. The drive system of claim 6, wherein the piston-rod-sided cylinder chambers of said supplemental cylinders are connected through a combined directional and check valve (35) to the piston-rod-sided cylinder chamber (18) of said press cylinder.

8. The drive system of claim 1, wherein said second hydraulic machine (7) is driven by the fluid volume displaced from the piston-sided cylinder chamber (17) of said press cylinder when said cylinder chamber is relieved from pressure and wherein the outlet port of said second hydraulic machine communicates with the piston rod sided cylinder chamber (18) and said cylinder chambers (30,31) of said supplemental cylinders.

9. The drive system of claim 1, comprising a directional control valve (36) which is provided in the hydraulic connecting line between the second hydrostatic machine and the press cylinder, said valve passing fluid from the hydraulic system of said press for flushing said press at stillstand and wherein the fluid drained is replaced from the fluid system and wherein the second hydraulic machine is driven by the fluid displaced in flushing.

10. The drive system of claim 1, wherein a valve (38) is provided between the low pressure port of said second hydrostatic machine (7) and a low pressure system (9) which valve drains fluid from the piston-sided cylinder chamber of the press cylinder to the low pressure system for flushing the running press in the process of being pressure relieved, wherein the fluid drained is replaced from the fluid system of constant pressure and wherein said second hydraulic machine is driven by said drained fluid.

11. The drive system of claim 1, wherein the piston-rod-sided cylinder chambers of said cylinders are connected through control valves (33,33',35) to the low pressure port of said second hydraulic machine (7).

12. The drive system of claim 1, wherein the press cylinder includes a synchronizing piston, comprising at least a supplemental cylinder (28,29) acting parallel to said press cylinder, wherein both cylinder chambers of said synchronizing cylinder are connected to each other and to a second hydrostatic machine (7), and wherein a second hydraulic transformer is provided comprising a first hydrostatic machine (6') and a second hydrostatic machine (7'), both said machines having an adjustable flow rate and wherein said first machine is connected to the fluid system of substantially constant pressure and said second machine is connected to the piston-rod-sided cylinder chambers of said supplemental cylinders.

* * * * *